United States Patent [19]
Davis

[11] Patent Number: 5,107,641
[45] Date of Patent: * Apr. 28, 1992

[54] CERAMIC BRICK

[75] Inventor: Thomas E. Davis, Ann Arbor, Mich.

[73] Assignee: Cerline Ceramic Corporation, Anderson, Ind.

[*] Notice: The portion of the term of this patent subsequent to Nov. 21, 2006 has been disclaimed.

[21] Appl. No.: 422,360

[22] Filed: Oct. 16, 1989

Related U.S. Application Data

[63] Continuation-in-part of Ser. No. 204,846, Jun. 10, 1988.

[51] Int. Cl.⁵ .............................................. E04B 1/60
[52] U.S. Cl. .................................. 52/127.7; 52/511; 52/715; 110/338
[58] Field of Search ................. 52/127.7, 506, 511 X, 52/589, 715 X; 110/338 X, 339, 340

[56] References Cited

U.S. PATENT DOCUMENTS

| | | | |
|---|---|---|---|
| 22,108 | 6/1942 | Crecca | 114/84 |
| 3,350,832 | 11/1967 | Persson | 52/506 |
| 3,624,344 | 11/1971 | Kutzer | 219/127 |
| 3,687,093 | 8/1972 | Byrd, Jr. | 110/1 |
| 3,747,291 | 7/1973 | Perigo et al. | 52/127 |
| 4,136,625 | 1/1979 | Corbet | 110/339 X |
| 4,137,681 | 2/1979 | Pasley | 52/506 X |
| 4,520,601 | 6/1985 | Stacey, Jr. | 52/127 |

Primary Examiner—David A. Scherbel
Assistant Examiner—Robert Canfield
Attorney, Agent, or Firm—Jay C. Taylor; Neal A. Waldrop

[57] ABSTRACT

A weldable abrasion resistant ceramic brick is formed with spaced recesses extending angularly into the brick to undercut a surface thereof and interlock with a weldable insert having angularly extending projections mating with and insertable into the recesses. Each recess may be defined by a wall inclined into the undercut for camming an aligned projection into the undercut. The insert and brick may be interlocked and thereafter welded to a substrate, or the insert may first be welded to the substrate and thereafter interlocked with the brick. The invention is particularly useful with comparatively thin abrasion resistant wear plates that heretofore could not be welded satisfactorily to a substrate.

20 Claims, 7 Drawing Sheets

CERAMIC BRICK

The present invention is a continuation-in-part of the invention described in copending patent application, No. 07/204,846, filed Jun. 10, 1988, now U.S. Pat. No. 4,881,348, issued and Nov. 21, 1989 and the Serial disclosure thereof is retained herein by reference. This invention relates to improvements in a ceramic brick of the type described in the earlier application, and to improved methods for manufacturing and using such a brick.

BACKGROUND OF THE INVENTION

It is conventional in industries involving the transportation or storage of abrasive materials, such as coal, various mineral ores, or other abrasives, to provide a steel substrate or liner for a wall or surface to be protected, and thereafter to weld specially prepared abrasion resistant ceramic tile or bricks to the backing. The surface to be protected may comprise by way of example the wall of a pipe or a chute exposed to abrasion, or surface portions of a military vehicle exposed to shrapnel or small arms fire.

Such bricks are commonly one inch thick fired silicon ceramic, such as an aluminum-silicon oxide or a silicon carbide compacted under high pressure from a dry powder and optionally with a suitable binder. The typical brick has four by six inch faces, although the dimensions may vary appreciably, say from one-half to two inches in thickness, with faces ranging from less than four inches in the shorter dimension to more than nine inches in the longer dimension. Also the brick may be molded from a molten abrasive resistant material such as basalt or an aluminumzirconium-silicate.

A common weldable brick is formed with a central welding hole about one inch in diameter that extends through an outer face of the brick and is constricted slightly adjacent to the opposite inner face to confine a weldable metallic insert. The latter is inserted into the larger or unrestricted opening of the welding hole and is retained adjacent to the restricted end by friction. With the welding insert arranged coaxially in the hole, the metal insert is welded to the steel backing or liner, either by conventional MIG (metal inert gas) welding or by conventional use of an arc welding rod. Thereafter the unrestricted opening of the welding hole is closed by insertion of a cylindrical closure plug.

In some instances, it is preferable to weld the metal insert by conventional arc welding to the steel backing or liner, but arc welding is not particularly convenient with the type of brick available heretofore because it is difficult to maintain the metal welding insert in a coaxial position at the reduced end of the hole. The welding insert is provided with a central opening through which a welding rod or wire must pass in order to contact the steel wall or backing. When the welding rod is extended through the aforesaid central opening in the welding insert, the latter is frequently knocked out of alignment by the rod and welded in a cocked position to the steel liner. A similar problem arises even during MIG welding when the MIG welding wire is inserted through the welding insert into contact with the steel backing or liner to which the brick is to be secured.

Not only will the resulting weld be less secure, but the cocked insert in some instances prevents the cylindrical closure plug from fitting flush with the outer surface of the brick. The plug will thus be subjected to excessive abrasion and will rapidly wear away. Furthermore, although the cylindrical plug is usually cemented within the welding hole, it frequently works loose even when it is flush with the outer surface of the brick, whereupon the metallic insert will rapidly wear away by the abrasive action and the entire brick will be dislodged.

Even if the metallic insert is properly located and welded to the steel backing, the cylindrical closure plug cannot extend axially within the welding hole to the extent desired because a certain amount of space must be allowed to accommodate the situation when the metallic insert is cocked out of its coaxial alignment within the hole. Accordingly, the wear resistant thickness of the brick at the region of the approximately one-inch diameter welding hole will be considerably less than the thickness of the adjacent portions of the brick. When the thinner cylindrical plug eventually abrades away, the metallic welding insert is rapidly disintegrated by abrasion at the exposed hole.

In addition, the one inch centrally located hole tends to weaken the brick across the diameter of the hole. In consequence, the comparatively brittle ceramic brick tends to break when subjected to impact during use, or when the installer of the brick attempts to break off a portion in order to provide a close fit near the edge of the wall to be lined. In that event, the brick tends to crack at the middle through the one inch hole instead of at the region where the craftsman's hammer strikes the brick.

An additional objection to bricks of the type described is that three loose pieces are required, i.e., the brick, the insert, and the cylindrical plug. The insert may be cemented in place, but the cementing involves an additional operation and increases the cost of the brick.

The above noted objections in regard to conventional ceramic or abrasion resistant bricks are magnified for bricks of less than an inch thick. Although many situations exist where weldable ceramic bricks, of say less than one-half inch thickness would be desirable, especially where the excessive weight of thicker bricks is a major problem, no such brick suitable for use in a wide range of applications has been available heretofore. Also solid bricks with no through hole are desirable for use in many applications, regardless of thickness. Such bricks are stronger, less subject to fracture by impact, and exhibit maximum wear life when subject to abrasion. However, attempts to secure solid bricks as an impact and abrasion resistant protection to a substrate have not been successful because of the imperviousness of the brick to the adhesive, usually an epoxy resin, the brittleness of the adhesive as it ages, and the extensive preparation of the substrate surface required for the cementing.

SUMMARY OF THE INVENTION

Important concepts of the present invention have been to provide improvements in a ceramic or abrasion resistant brick of the general type described above, and also to provide improvements in a brick referred to herein as a "solid" brick because it does not require a large opening or through-hole to contain the body of a weldable insert or to enable welding of the insert to a substrate, and also to provide a unique method for fabricating the brick and for securing it to a substrate. Being "solid", the brick is especially suitable for use where comparatively thin bricks are desired, although the present invention is also suitable for use with comparatively thick bricks where ultra high impact resistance and wear resistance are required.

The brick is formed with a plurality of comparatively shallow spaced recesses, preferably two, spaced by a plane surface of the brick and opening into and undercutting that surface to cooperate with a weldable sheet steel insert having a plane base adapted to lie flush with the brick surface spacing the recesses and also having a corresponding plurality of flanges or projections arranged to be extended into the recesses upon suitable deformation of the insert so as to underlie and interlock with a portion of the brick surface. In one modification of the insert, its projections are arranged to confront and extend toward the openings of the recesses for insertion thereinto. One wall of each recess inclines from the recess opening into the undercut and is arranged to engage the distal end of the confronting projection and deform and cam the latter into the undercut when the insert and brick are forced toward each other. Thus the several projections, when deformed into the undercuts of the spaced recesses, interlock the insert and brick. When the insert and brick are forced together to deform and interlock the projections within the recesses, the sheet steel body of the insert between its projections may lie snugly against the adjacent exterior surface of the brick that spaces the recesses.

The result is a weldable brick with no through-hole, that utilizes minimum ceramic thickness to effect an interlock with a weldable insert, and is particularly suitable for use with thin ceramic bricks or wear plates in the range of approximately a quarter of an inch thick. Such bricks or wear plates have extensive applications in industry, but because suitable weldable thin wear plates have not been available heretofore, wear plates thicker than necessary have been used in order to avoid the unreliability associated with adhesive mounted plates or bricks and to obtain a weldable feature, with consequent overdesign, excessive cost, and weight penalties.

The above described brick may also be secured to a substrate in a unique manner. Prior to interlocking the brick and insert, the latter may be secured first to the substrate at the location where the brick is desired, preferably by welding if the substrate is weldable, or by other means such as a bolt or rivet, with the projections of the insert extending outwardly from the substrate. Thereafter the brick, with its recesses aligned with the distal ends of the projections, is forced toward the insert to cam and deform the projections into the undercut recesses. Of course thicker bricks may be cored sufficiently between the undercutting recesses to enable the entire body of the insert to be recessed into the confronting surface of the brick, and likewise, thicker bricks secured to an insert as described herein may be provided with through-holes to enable their welded attachment to a substrate as disclosed in my copending application, including welding from the back side of the substrate through a pre-formed hole therein. The latter procedure enables use of a weldable brick having no throughhole provided that the back side of the substrate is accessible.

It has been conventional to form a green ceramic brick by compacting dry powdered ceramic within an open top female die cavity by means of a mating male die plunger dimensioned to move into the open top and seal the same against extrusion of ceramic powder therefrom during the high pressure compression operation, but to allow the escape of air from between the juxtaposed male and female die parts. Thereafter the green brick is baked or fired to complete the extremely hard abrasion resistant brick. The female die cavity provided side and bottom walls to form the edges and one face of the brick, and the male die plunger formed the opposite face of the brick. Inasmuch as the particles of the ceramic powder prior to being compacted together contained large quantities of air therebetween, the conventional molding procedure involved a preliminary or partial compression to compact the ceramic particles closely together to expel the air therefrom, followed by a momentary dwell period to allow time for the air to escape. Thereafter the compression is resumed to effect the final extremely high tonnage pressure, followed by a second momentary dwell period to allow time for the escape of residual air, and thereafter ejection of the green brick from the mold. The resulting brick is usually a rectangular block or plate, and any surface indentations are necessarily shallow with outwardly sloping edges. The formation of undercutting recesses of the type described herein was impossible by known procedures because the extremely high molding pressures required to form a high density abrasion resistant ceramic brick would distort or cave in such recesses as soon as formed.

Another important concept of the present invention results from the discovery that if recess forming punches are forced into the surface of the brick after the aforesaid first dwell period and before the final high tonnage compression, and are withdrawn after completion of the high tonnage compression and the second dwell period, the resulting undercutting recesses will not h=deformed when the recess forming punches are withdrawn from the newly formed green brick.

A modification of the conventional brick molding apparatus comprises a pair of hydraulically actuated punches carried by the male die plunger and shaped to form the above described recesses The punches are connected to a corresponding pair of double acting hydraulically actuated pistons within cylinders contained in the body of the die plunger and, upon completion of the first dwell period, are forced angularly into one surface of the partially compacted ceramic to the extent necessary to form the undercutting recesses, as for example at approximately a 60 angle of inclination to the brick surface and at least an eighth of an inch beyond that surface. Thereafter the final compacting pressure is applied to compact the powdered ceramic tightly against the male die plunger and around the inclined punches. After the second dwell period, the punches are retracted and the molding pressure is immediately released.

By virtue of the multiple stage compacting sequence described, the undercut recess may be formed and the recess forming punches may then be withdrawn without deforming the recesses or allowing them to collapse under the final compacting pressure. Movement of the die parts to the preliminary or partial compacting position, followed by the first dwell period to allow the escape of air, sets the powdered ceramic sufficiently so that after insertion of the recess forming punches, the subsequent high tonnage compression does not cause unbalanced compression forces on the powdered ceramic around the punches sufficient to cause deformation of the recesses when the punches are withdrawn or when the formed green brick is subsequently baked. During the final compacting movement of the die parts, the powdered ceramic is compacted above and below and around all sides of the inserted punches. The final dwell period enables the escape of essentially any remaining air and the setting of the compacted ceramic so that the subsequent withdrawal of the recess forming punches does not allow collapse or significant deformation of the resulting undercut recesses.

In accordance with another modification of the concept utilizing the undercut recesses and cam surfaces and useful with thicker ceramic bricks, a central opening is provided in the recessed surface of the brick sufficient to accommodate the central sheet steel body of a weldable insert. A pair of projections incline from one surface of the central sheet steel body and away from each other in opposite directions from a transverse center line of the body. Each projection also extends from adjacent transversely opposite edges of the body to distal ends arranged to confront the openings of a pair of said undercutting recesses and to cammed and deformed thereinto as described herein. The recesses are spaced by said central opening and are also offset transversely from each other to facilitate manufacture of the brick as described in my copending application. Spacers at the edges of the body project from said one surface so as to seat on the bottom of the central opening of the brick when the insert and brick are interlocked by deformation of the inclined projections into the undercut recesses. The brick and insert combination may be used as described herein, or may be modified to enable preassembly of the brick and insert for welding to a substrate as disclosured in my copending application.

Another modification utilizes a brick having a central opening for receiving the body of a weldable sheet steel insert having only one projection at one end arranged for insertion into a single undercut recess that extends into one end wall of the central opening. The opposite end of the insert frictionally engages the opposite endwall of the central opening at an interference fit to retain the insert frictionally within the opening. The assembled brick and insert is suitable for use with thicker bricks and may be handled and shipped as a unit until the insert is welded to a substrate. Once welded to the substrate, the insert is positively interlocked with the brick without dependence on the frictional engagement.

Other modifications of the present invention utilizing the concept of a brick having a pair of spaced recesses undercutting one surface and particularly useful to provide a "solid" thin ceramic brick employ a hardened spring steel insert formed from sheet steel to provide a resiliently deformable body. A pair of projections at opposite ends of the body and inclined to mate with the undercut recesses have distal ends arranged to confront the openings of the recesses and to be inserted thereinto upon resilient deformation of the body. After the projections are inserted into the recesses, the body is released to return resiliently to its undeformed position and interlock with the brick.

In one situation, the insert body is deformable either by being stretched or compressed endwise to align the distal ends with the openings of the recesses, whereupon the projections are forced into the confronting recesses. Upon release of the endwise deforming force, the insert returns resiliently to its undeformed condition to interlock with the brick. In another situation, the body of the spring steel insert is bowed resiliently to enable insertion of its projections into the openings of the recesses. Thereafter upon release of the bowing force, the insert returns to its undeformed condition to interlock with the brick.

Still another modification provides an insert comprising multiple weldable parts, each having a projection readily insertable into one of each of a corresponding number of recesses undercutting a surface of the brick. The separate parts are arranged so that when inserted into their associated recesses, they have juxtaposed portions that can be cemented or welded together to prevent removal of the insert from the brick. Thereafter the brick and assembled insert may be welded to a substrate as described herein. In a preferred embodiment of the latter modification, the separate parts have interfitting snap-together portions that temporarily prevent their separation from the brick to facilitate handling and shipping of the assembled brick and insert parts. In either situation, after being welded to a substrate, the parts become permanently interlocked with the brick.

Other advantages and uses of the present invention will be apparent from the following description and appended claims, reference being had to the accompanying drawings forming a part of this specification wherein like reference characters designate corresponding parts in the several views.

BRIEF DESCRIPTION OF THE DRAWINGS

The drawings described below are schematic representations of preferred embodiments of my invention, not necessarily to scale, and FIGS. 1-3 are extracted from my copending application to illustrate different ways for welding the various modifications to a substrate, wherein:

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

DETAILED SUMMARY OF THE INVENTION

Figure 1:
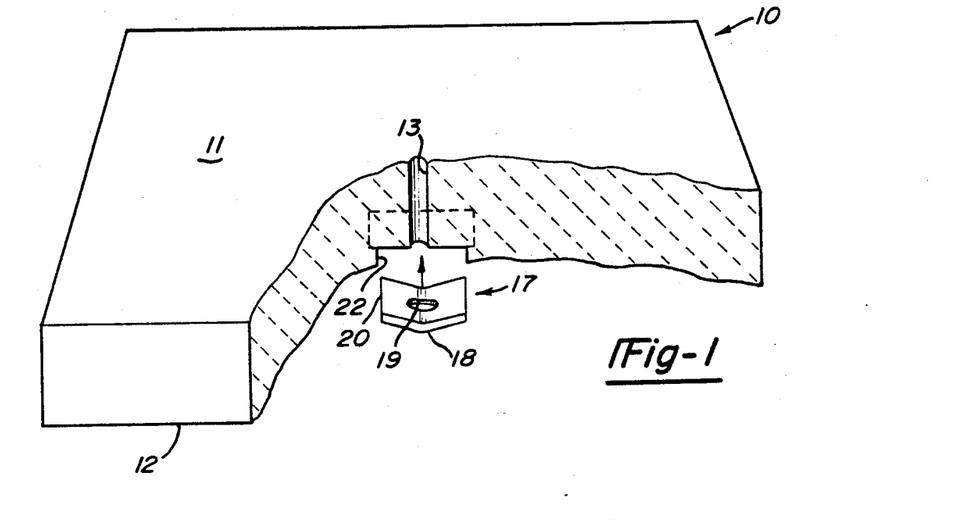
FIG. 1 is a fragmentary view showing a ceramic brick and a weldable insert in position for insertion into the insert receiving recess of the brick.
Figure 2:
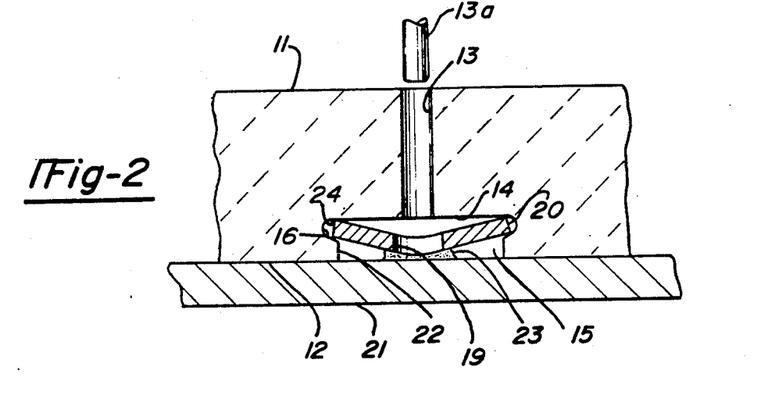
FIG. 2 is a view similar to FIG. 1, illustrating the insert deformed within the recess and welded to a sheet steel substrate.
Figure 3:
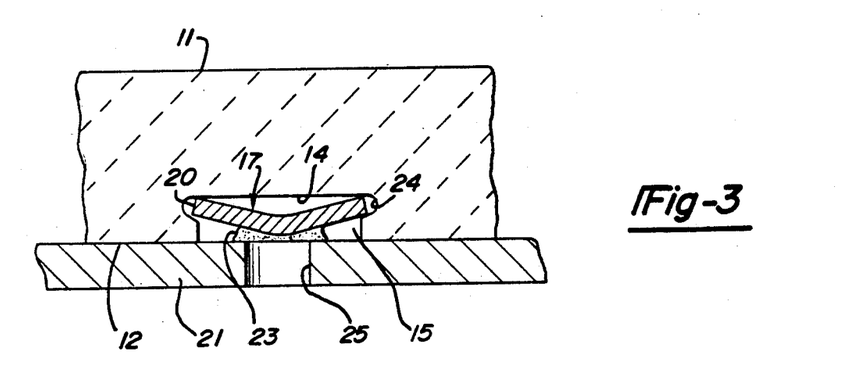
FIG. 3 is a view similar to FIG. 2, but illustrating a modification wherein the welding is accomplished through a hole in the substrate.

Referring to FIGS. 1-3, an aluminum oxide ceramic brick 10 of approximately one-inch thickness is illustrated having approximately four-inch by six-inch rectangular outer and inner parallel faces 11 and 12. A small diameter guide hole 13 for a welding rod 13a extends normally through the face 11 at a central location for approximately three-quarters of an inch and enlarges radially to provide a plane ceiling 14 of approximately one square inch for an essentially square or rectangular recess 15. From a pair of opposite edges of the ceiling 14, the side walls 16 of the recess 15 converge toward a mid-plane along the guide 13 at approximately a thirty to forty-five degree angle and toward walls of the brick normal to surface 12 to define an insert receiving opening 22 into the recess 15, thereby to undercut opposite edges of the opening 22 at 24.

A welding insert 17 may be formed from a mild steel or low carbon twelve gauge sheet steel blank to provide a V-base 18 having a central opening 19 of somewhat larger diameter than the diameter of the guide hole 13, and a pair of diverging ends or prongs 20 adapted to project toward the ceiling 14. The prongs 20 in the undeformed condition shown in FIG. 1 diverge at approximately 110° from the apex of the V and are dimensioned to pass readily through the insert receiving opening 22 into the recess 15 and into sliding engagement with the ceiling 14. The prongs 20 are dimensioned so that upon the application of force urging the insert 17 toward the ceiling 14, their distal or outer ends will engage and slide along the extremely hard surface of the ceiling 14 and be deformed radially outwardly into the maximum diameter of the undercut recess 15, FIGS. 2 and 3, without appreciably scratching the hard material of the ceramic brick 10. The insert 17 will thus be mechanically interlocked rigidly with the brick 10, and the base 18 within the recess 15 will be spaced from the surface 12 approximately a sixteenth of an inch to enable formation of a molten pool 23 of welding rod material to connect the insert 17 and wall 21. The term "rod" as thus used and hereinafter will encompass elongated welding materials such as an electrically charged welding rod or wire used respectively in conventional arc or MIG welding. Thus the diameter of the guide hole 13 may be as small as 0.035 inches and no larger than one-eighth of an inch where MIG welding is available, or approximately three-sixteenths of an inch when required for guiding a conventional arc welding rod.

The assembled brick 10 and welding insert 17 may be shipped to the location where it is intended to be welded to the steel wall 21 or other backing to be protected from abrasion. At the welding site, the brick 10 is placed with its inner face 12 adjacent to the wall 21. A welding rod 13a is then inserted into the guide hole 13 and guided thereby coaxially through the opening 19 and into contact with the steel wall 21 without touching the insert 17. The arc welding operation is then carried out conventionally, such that the heat of the arc melts the end of the rod 13a in contact with the electrically grounded wall 21 and forms a pool of molten welding material 23 that hardens to provide a welded bond around the hole 19 and between the insert 17 and the wall 21.

If the recess 15 is rectangular, the undercuts 24 are provided along the opposite shorter ends, such that the long dimension of the ceiling 24 of the recess 15 is aligned with the long dimension of the brick 10. The inclined walls 16 of the recess 15 converge from the undercuts 24 to within approximately one-eighth of an inch from the inner face 12, then extend essentially normally to that face (except for a small draft angle required to facilitate removal of the mold parts) to define the insert receiving opening 22 into the recess 15 through the inner face 12. The aforesaid draft angle for the various embodiments illustrated herein will be nominal because immediately upon release of the molding pressure required to form the green brick, the newly formed and unfired brick will expand slightly to facilitate removal of the recess forming mold parts.

It will be appreciated that the weldable brick may be readily used to line steel hoppers, chutes, or other conduits or surfaces that are accessible for welding through the guide holes 13. FIG. 3 illustrates a situation wherein the brick 10 may be provided with an undercut recess 15 opening at its inner face 12 as described above, but the guide hole 13 for the welding rod is eliminated. In lieu thereof, a hole 25 is burned or cut into the steel substrate 21 at the location where the weld is desired. The brick 10 with an interlocked insert 17 is then aligned with the hole 25. The weld between the insert 17 and substrate 21 is then completed by conventional arc or MIG welding from the exterior of the substrate 21 through hole 25. In the FIG. 3 application, the central hole 19 in the insert 17 may also be eliminated.

Figure 4:
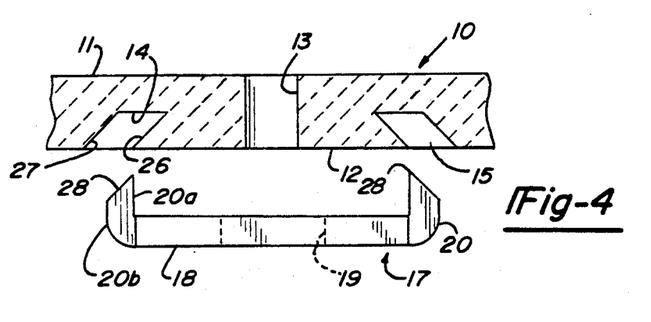
FIG. 4 is a view similar to FIG. 1, illustrating a modification adapted for use with abrasion resistant wearplates approximately one-quarter of an inch thick.
Figure 5:
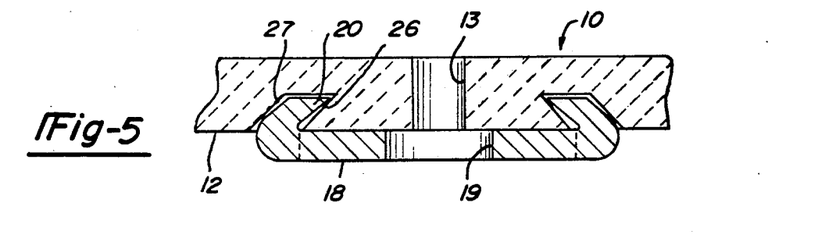
FIG. 5 is a view similar to FIG. 2, illustrating the weldable insert of FIG. 4 deformed and assembled with the ceramic wearplate.
Figure 6:
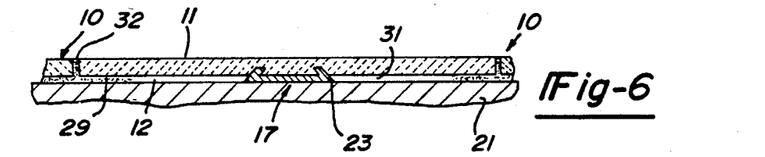
FIG. 6 is a reduced view similar to FIG. 2, illustrating a modified thin walled wearplate and insert, wherein the insert is welded to a sheet steel substrate before being deformed into interlocking engagement with the brick.

Referring to FIGS. 4-6, a modification of the invention that is particularly adapted for use with thin ceramic wearplates or bricks similar to the brick 10 of FIGS. 1-3, but "solid" and approximately a quarter of an inch in thickness. The brick 10 shown in FIGS. 4-6 may be provided with a small central guide hole 13 as in FIGS. 1 and 2, that equally spaces a pair of oppositely angled recesses 15 approximately two inches apart. For a rectangular brick 10 as in FIG. 1, the recesses 15 are preferably centered on a longitudinal midplane along the opening 13 and parallel to the longer edges of the brick. The transverse extent of each recess 15 is perpendicular to the longitudinal midplane and is approximately a half an inch, and each is defined by closely spaced parallel walls 26 and 27 proximate to and remote from the guide hole 13 respectively. The wall 26 undercuts the surface 12 and inclines at approximately a 60° angle to the surface 12 to a ceiling 14 parallel to the surface 12. The ceiling 14 is preferably spaced about an eighth of an inch from the surface 12, i.e., one-half way between the surfaces 11 and 12. For thicker bricks of say one-half to an inch, the ceiling may be spaced approximately a quarter of an inch from the surface 12.

The weldable insert 17 may be stamped from the same type of sheet steel and gauge thickness as in FIGS. 1-3 to form a square or rectangular flat body 18 having projections 20 at opposite edges that extend essentially perpendicularly from the plane of the body 18, FIG. 4, so as to be alignable with the openings of the recesses 15. The distal ends 28 of the projections 20 incline toward each other at an angle to the interior wall 20a of the associated projection 20 that is slightly less than the aforesaid angle of inclination of the walls 26 and 27, thereby to provide clearance for the deformed and assembled projections 20 between the walls 26, 27. In this regard, the latter walls are spaced sufficiently to freely receive the associated undeformed projections 20 therebetween, and the distal end of the outer wall 20b of each projection 20 is arranged to engage the extremely hard surface of the associated wall 27 when inserted into the recess 15. When the brick and insert are aligned as in FIG. 4 and forced toward each other, the projections 20 are cammed and deformed into the portion of the recess 15 undercutting the brick surface 12, thereby to interlock the brick and insert. Obviously the projections 20 are also dimensioned to extend adjacent to the ceiling 14, as in FIG. 5 when the brick and insert are assembled.

It is apparent from the foregoing that an interlocked weldable insert and abrasion resistant ceramic brick are provided that avoids a central opening for the body 18 of the insert and thus enables the provision of a thin walled brick and wearplate having optimum shock or impact resistance. The small guide hole 13 is usually of no concern in regard to impact resistance and may be used to secure the brick to a weldable substrate as described in regard to FIG. 2.

On the other hand, where optimum impact resistance is required, the guide hole 13 may be eliminated, FIG. 4. In that situation, the insert 17 is first welded to the substrate 21 at the location where it is desired to secure the brick, with the undeformed projections 20 extending from the substrate 21. Thereafter the brick is aligned with and forced against the insert 17 as described above to interlock the brick 10 with the insert 17 that has been previously welded to the substrate.

In a preferred application of the invention illustrated in FIGS. 4-6, prior to forcing the brick into interlocking engagement with the insert 17, the recesses 15 are filled with a soft but hardenable caulk, as for example a mixed epoxy resin or with an RTV silicone. The peripheral inner surface 12 of the brick may also be coated with the caulk 29. Thereafter the brick 10 and insert 17 are aligned as in FIG. 4 and forced together to deform the insert and effect the interlocking engagement as described above. As the brick is forced toward the insert to deform the projections 20 into the undercut recesses 15, the caulk in the recess 15 will be extruded around the projections 20 to completely fill all spaces between the latter and the sidewalls of the recesses. When the caulk hardens, it adheres to the brick 10 and the projection 20 to appreciably enhance the interlocking engagement and prevents return of the insert to its undeformed shape.

Usually the brick will be welded to the substrate at a location adjacent to a previously installed brick. As each brick is forced into position, the caulking 29 around the peripheral edges of the brick 10 will be flattened to fill the space 31 between the brick and substrate caused by the thickness of the body 18. Also the caulking 29 will be extruded at 32 between the juxtaposed bricks 10 and should be wiped clean from the brick surfaces 11 to complete the job.

Figure 7:
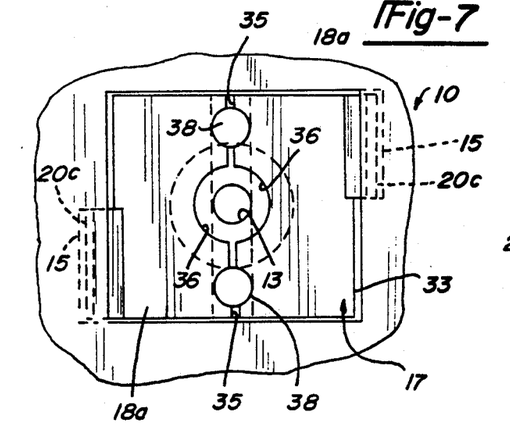
FIG. 7 and 8 are plane and sectional views respectively of a modification wherein the insert comprises multiple parts readily insertable into a recessed surface of the brick and thereafter interlocked with the brick by being secured together.
Figure 8:
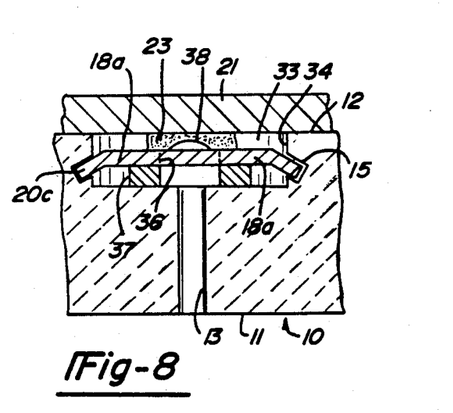

Referring to FIGS. 7 and 8, a modification of the invention more particularly suitable for use with thicker bricks provides an essentially rectangular opening 33 in the surface 12 of the brick 10. Opposite walls 34 of the recess 33 extend essentially perpendicularly to the surface 12 and are provided with recesses 15 that diverge oppositely from each other at approximately 30 degrees to the surface 12. The recesses 15 extend approximately a quarter of an inch beyond the surfaces of the walls 34 and open thereat approximately an eighth to a quarter of an inch below the surface 12.

The weldable insert 17 may likewise be formed from a sheet steel blank of the type described in regard to FIG. 1, but comprises two identical and essentially rectangular body parts 18a, each rotated 180 degrees with respect to the other around the axis of the guide hole 13. Each insert body 18a is provided with a single projection 20c adapted to fit freely within one of the recesses 15 offset transversely from each other on opposite sides of the longitudinal midplane of the brick along the guide opening 13 in order to facilitate fabrication as disclosed in my copending application. The separate insert parts 18a when inserted into opening 33 and into their respective recesses 15 provide confronting edges 35 spaced apart sufficiently to facilitate assembly of the parts 18a within their respective recesses. The confronting edges 35 also provide semicircular recesses 36 that cooperate to provide a welding hole coaxial with the guide hole 13. Preferably an annular spacer 37 is arranged coaxially with the opening 13 in position underlying the body parts 18a to hold the same essentially in parallelism with the surface 12 until the separate parts 18a are secured together, either by cementing or spot welding at 38. Once the parts 18a are secured together, they cannot be removed from the opening 34. Preferably the surfaces of the parts 18a proximate the surface 12 are spaced from the latter within the opening 34 to provide space for a pool of molten weld material 23 when the brick is secured to the substrate 21 as described above.

Figure 9:
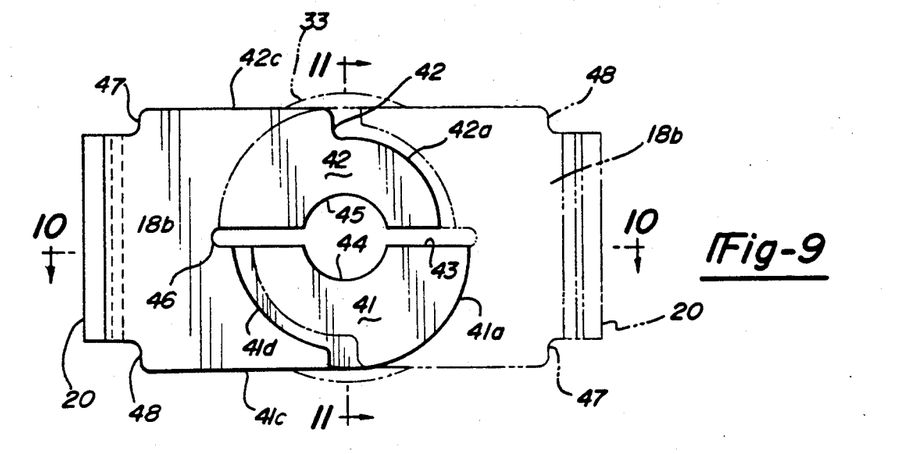
FIG. 9 is a view similar to FIG. 7 illustrating a weldable insert comprising a pair of identical parts separately insertable into the recessed brick and frictionally secured to each other to prevent accidental removal from the brick until welded together, one part of the two part insert being shown by solid lines and the other part being illustrated by phantom lines.
Figure 10:
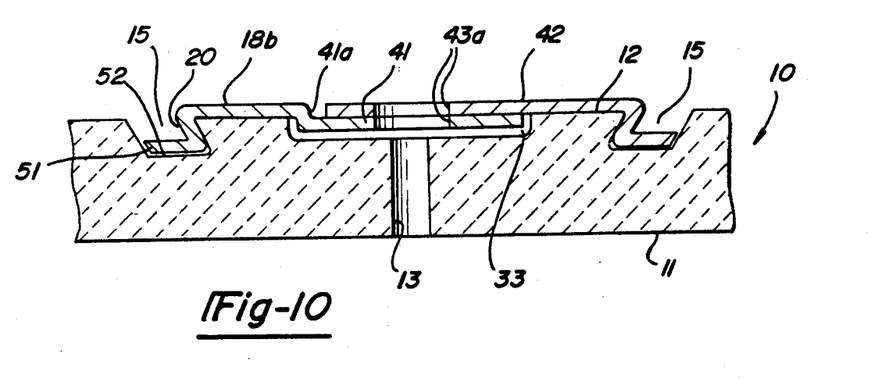
FIG. 10 is a transverse sectional view taken in the direction of the arrows substantially along the line 10-10 of FIG. 9, showing both weldable parts of the insert assembled with the brick.
Figure 11:
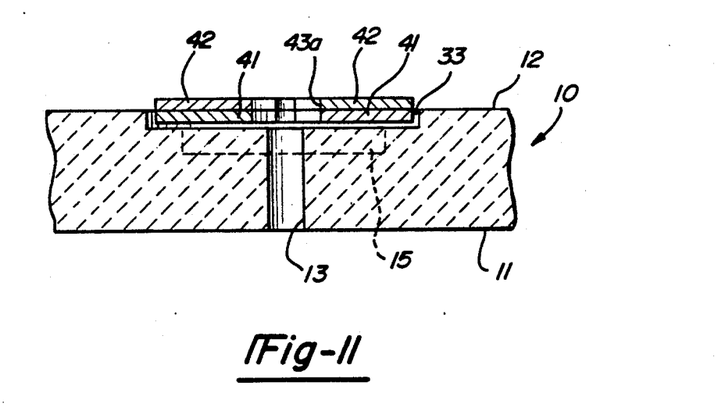
FIG. 11 is a transverse sectional view taken in the direction of the arrows substantially along the line 11-11 of FIG. 9.

Referring to FIGS. 9–11, another modification employing a weldable insert formed from two separate identical sheet steel stampings is illustrated. Each separate stamping comprises a flat body 18b having a projection 20 at one end capable of being freely inserted into one of a pair of undercut recesses 15 in the brick 10 and being frictionally interengagable with the other separate stamping, shown in phantom in FIG. 9, to prevent their accidental separation from the brick until they are permanently welded together by being welded to a substrate. The brick 10 is provided with a central circular opening 33 for freely receiving portions of the inserts, and the usual guide hole 13 where desired. The opening 33 spaces the recesses 15 inclined toward each other so as to undercut the brick surface 12, FIG. 10.

Extending from each body 18b and away from its projection 20 are a pair of plates or leaves 41 and 42 spaced by a slit 43 that extends along the longitudinal midplane of the body 18b from the end thereof opposite the projection 20 and terminates at a rounded end 46 near the projection 20. The plate 42 comprise an overlapping leaf that extends arcuately at 42a approximately 90° away from the opening of the slit 43, then radially at 42b to the adjacent edge 42c of the body 18b. That edge extends parallel to the longitudinal midplane essentially to the projection 20 where it narrows at 47, then extends to one transverse end of the projection 20. The plate 41 comprises an underlying leaf that extends arcuately at 41a away from the slit 43, but at a larger radius than 42a, for a little less than 90° to the adjacent edge 41c of the body 18b. The latter edge extends parallel to the edge 42c toward the projection 20, narrows at 48, then extends to the other transverse end of the projection 20. The leaf 41 is also offset at 41d an amount approximately equal to the sheet metal thickness of the body 18b so as to lie freely within the opening 33 when the separate parts 18b are assembled with the brick 10.

The two identical weldable parts are rotated 180° with respect to each other so that the plates 41 and 42 may be closely interleaved in frictional contact with each other, with each plate 42 of one stamping overlying the underlying plate 41 of the other stamping. To facilitate welding to a substrate 21 as described above, each part 41 and 42 is provided with a circular recess 43a opening at the slit 43 to provide a hole for passage of a welding rod. The two interleaved stampings may be slidably elongated prior to assembly with the brick 10 until the extensions 20 overlie their respective recesses 15, then as the extensions 20 are moved into their recesses 15, the extensions will simultaneously be moved toward each other by sliding the interleaved plates 41, 42 toward the final assembled position, FIG. 13.

In FIGS. 9–11, the undercut recesses 15 are appreciably wider than necessary to receive the sheet metal thickness of the projection 20. The latter is provided with an extension 51 parallel to the surface 12 and dimensioned to fit adjacent to a mating parallel surface 52 defining the base of the recess 41. Thus the assembled and interleaved parts 41, 42 of the weldable insert cannot shift endwise and permit loosening of the frictional engagement therebetween. As noted in FIG. 10, the opening 33 may be deeper than necessary to receive the plates 41, thereby to provide an air space between the bottom of the opening 33 and the plates 41 to shield the ceramic from the direct heat of the welding operation.

Figure 12:
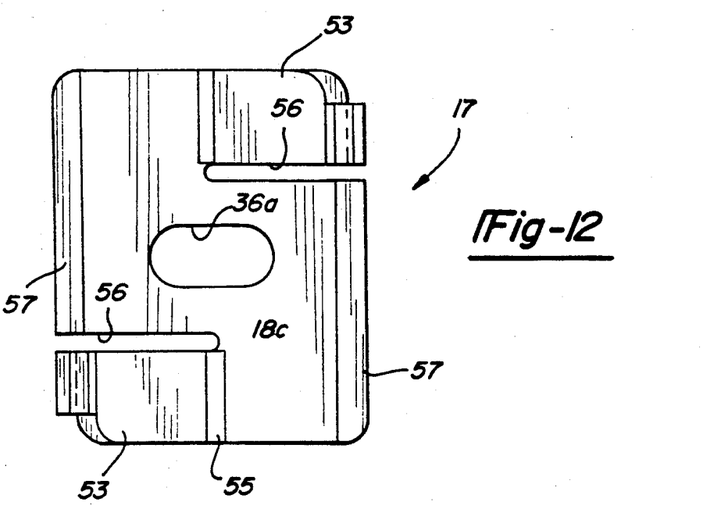
FIG. 12 is a plane view of another modification of a weldable insert.
Figure 13:
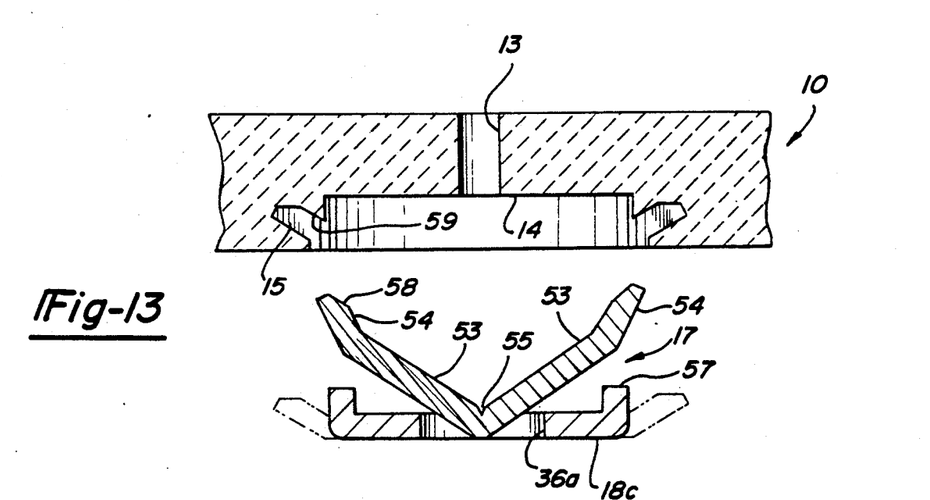
FIG. 13 is a view similar to FIG. 1, illustrating the insert of FIG. 12 in position for assembly with the ceramic brick.
Figure 14:
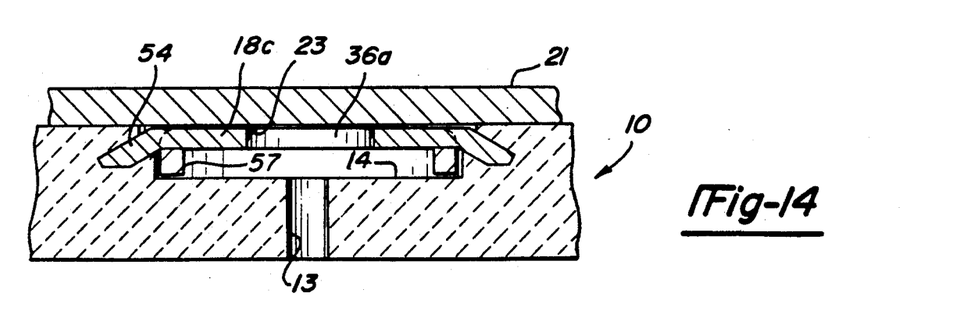
FIG. 14 is a view similar to FIG. 2, illustrating the insert of FIGS. 12 and 13 deformed and secured to the ceramic brick and welded to a sheet steel substrate.

FIGS. 12–14 show a modification of a deformable weldable insert 17 for use with a ceramic brick of the type illustrated in FIG. 8. The insert 17 is stamped from a sheet metal blank as described above to provide a flat body 18c having an opening 36a alignable with the guide hole 13 through the brick. In this case the hole 36a is elongated in the direction of the longitudinal midline of the brick in order to accommodate dimensional tolerances in the insert 17 that might result in its shifting longitudinally when the brick and insert are assembled. The body 18c is provided with a pair of oppositely directed transversely offset projections 53 that incline away from each other at approximately 120° to distal ends 54 arranged for alignment and insertion into correspondingly offset recesses 15. The juncture of each projection 53 with the body 18c is coined at 55 to provide a line of weakness to facilitate deformation of the projections 53 to the plane of the body 18c when the latter is assembled with the brick 10. Each projection 53 is spaced from the body 18c by a slit 56, and the two slits 56 associated with the projections 53 respectively extend parallel to the longitudinal midplane in opposite directions from adjacent to the transverse midline of the body 18c, such that the two projections 53 are offset transversely from each other as well as arranged to extend in opposite directions.

The opposite transverse edges of the body 18c provide flanges 57 that extend perpendicularly from the plane of the body 18c (in the same direction that the projections 53 extend) to provide spacers adapted to extend adjacent to the ceiling 14 of the recess 33 when the brick 10 and insert 17 are assembled. As illustrated in FIG. 13, the distal ends 54 are alignable with the openings of the recesses 15 and are provided with cam surfaces 58 arranged to slidably engage a mating cam surface 59 comprising one wall of the insert 15 and deform the ends 54 into the recess 15, as illustrated in FIG. 14, when the projections 53 are deformed into the plane of the body 18c. At the deformed position of the projections 53, 54, the spacer 57 will be adjacent to the ceiling 14 of the opening 33 to maintain the outer surface of the body 18c adjacent to but spaced slightly from the brick surface 12 to permit the accumulation of a pool of molten welding material 23 when the insert is welded to the substrate 21 as described above.

The structure of FIGS. 12–14 is partially adapted for use where the insert 17 is first welded to the substrate. Thereafter the brick 10 is forced against the projections 53, 54 to deform the latter into the recesses 15 as described above. If the insert is to be welded to the substrate 21 before being assembled with the brick, the guide hole 13 may be eliminated. If the insert 17 is not welded first to a substrate, the spacers 57 provide an air gap spacing the ceramic from the direct heat of the welding that then utilizes the welding rod guide hole 13.

Figure 15:
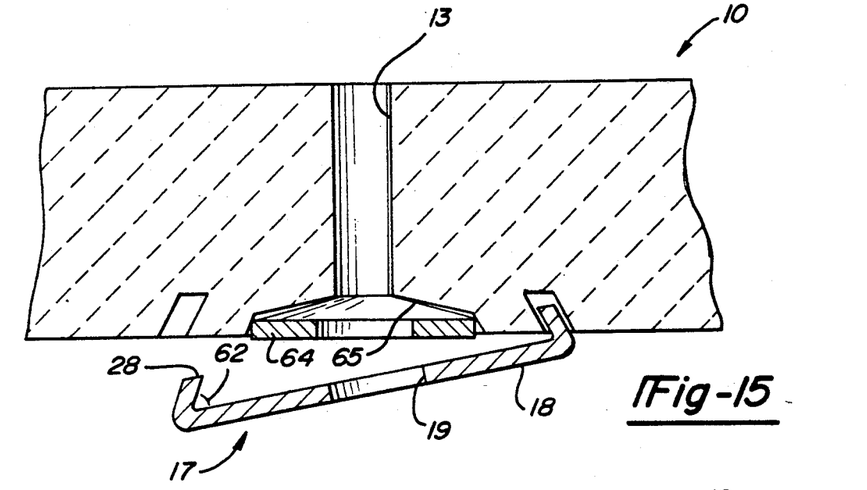
FIG. 15 is a view similar to FIG. 1, illustrating a modification of a spring steel insert resiliently deformable to enable assembly with a recessed ceramic brick, and which after assembly resiliently returns to its undeformed shape to interlock with the brick.
Figure 16:
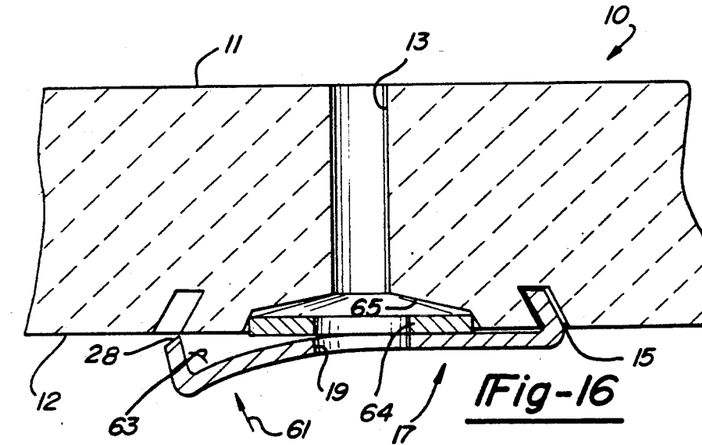
FIG. 16 is a view similar to FIG. 15, illustrating the resiliently yieldable insert partially deformed and immediately before being assembled with the brick.

FIGS. 15 and 16 illustrate a modification of the concept described in regard to FIGS. 4–6 wherein a brick provided with a pair of recesses 15 undercutting the inner surface 12 of the ceramic block 10 at diametrically opposite sides of the guide hole 13 receive the correspondingly inclined projections 20 upon deformation of the weldable insert 17. In this case, the insert 17 is stamped from a soft white sheet steel blank capable of being hardened by heat treatment to provide a resiliently deformable spring steel insert having a flat base 18 spacing the projections 20 dimensioned to fit within their associated recesses 15 and to underlie the surface 12 at their distal ends when the insert 17 is in its undeformed shape.

The brick 10 and insert 17 are assembled by inserting the projection 20 at one end into one of the recesses 15, such that the other projection 20 will rest on a portion of the surface 12 undercut by the other recess 15. Thereafter the base 18 is bowed toward the surface 12 by the application of force in the direction of the arrow 61, FIG. 16, so as to enlarge the included angle 62 between the undeformed projection 20 and base 18 and spread the distal end 28 of the projection 20 associated with the enlarged angle indicated at 63 to the extent that the end 28 may be forced into the opening of the recess 15.

In FIG. 16, the distal end 28 is on the verge of moving into the adjacent recess 15 and will move into that recess when the bowing force 61 is increased slightly. Thereafter the resiliently yieldable spring steel insert 17 will snap back to its undeformed condition to interlock both projections 20 within their respective recesses 15, preferably at a slight interference fit. In FIGS. 15 and 16, the distance between the parallel inclined walls 26 and 27 is dimensioned to freely receive the inserts 20. Additional interlocking effectiveness and total elimination of lost motion between the brick 10 and insert 17 may be enhanced by filling the recesses 15 with a hardenable caulk as described above.

FIGS. 15 and 16 illustrate a comparatively thick brick 10 having a central guide hole 13 for enabling welding to a substrate as in FIGS. 3 and 6. In the assembled position, the flat body 18 lies essentially flush with the surface 12 except for production tolerances, and an annular weldable reinforcement 64 underlies the base 18 within a bowl shaped opening 65 in the brick face 12 coaxially with the guide hole 13 and insert hole 19. Thus when the base 18 is welded around the opening 19 to a substrate 21 as in FIG. 3, the welding pool will also weld the reinforcement 64 to the base 18 to rigidize the central portion of the insert 17.

The concept of FIGS. 15 and 16 may also be employed with a brick having a thickness approximating a quarter inch. In that event, the reinforcement 64 and recess 65 may be eliminated. The bowl shaped recess 65 is effective to space the adjacent surface of the brick 10 from the direct heat of the welding to a substrate.

Figure 17:
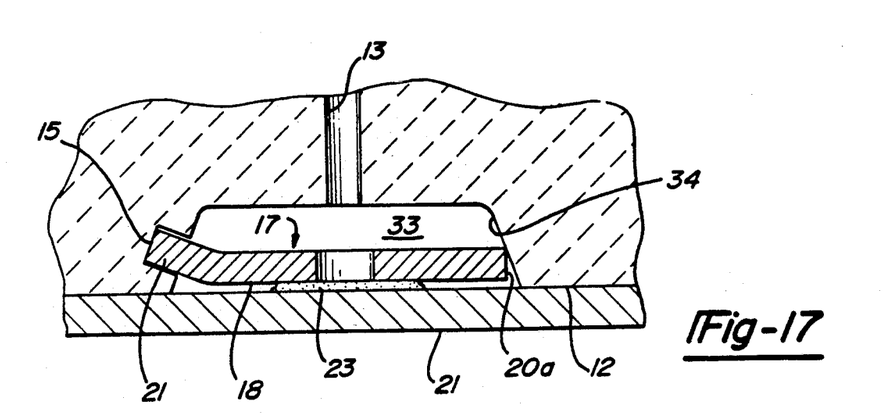
FIG. 17 is a view similar to FIG. 15, illustrating a modification wherein one end of an insert is readily assembled within a recess at one end of an opening in the brick and wherein the opposite end of the insert frictionally engages an opposite end wall of the opening to maintain the assembled relationship temporarily until the insert is welded to a substrate.

FIG. 17 illustrates a modification somewhat on the order of FIGS. 7 and 8 wherein the side walls 34 of the opening 33 for the body of the insert 17 diverge at approximately a 30 degree angle therebetween, i.e., approximately 15 degrees with respect to the axis of the guide hole 13, and the recess 15 undercutting the brick surface 12 extends into only one of the end walls 34. The insert 17 of FIG. 17 is stamped from a sheet steel blank as described in regard to FIG. 1 to provide a flat base 18 and a single projection 20 at one end inclined from the base 18 at the same angle that the parallel side walls of the insert 15 incline from the surface 12. The projection 20 is freely insertable into the opening of the recess 15 before the opposite end 20a enters the opening 33. The latter and insert 17 of FIG. 17 are dimensioned so that upon insertion of the projection 20 to the limit of movement into the recess 15, the end 20a can be forced into the opening 33 into frictional engagement with the adjacent inclined end wall 34 to temporarily lock the insert 17 within the opening 33. Thereafter when the insert 17 is welded at 23 to the substrate 21 as described above, the brick and insert are permanently interlocked without dependence upon the frictional engagement.

Figure 18:
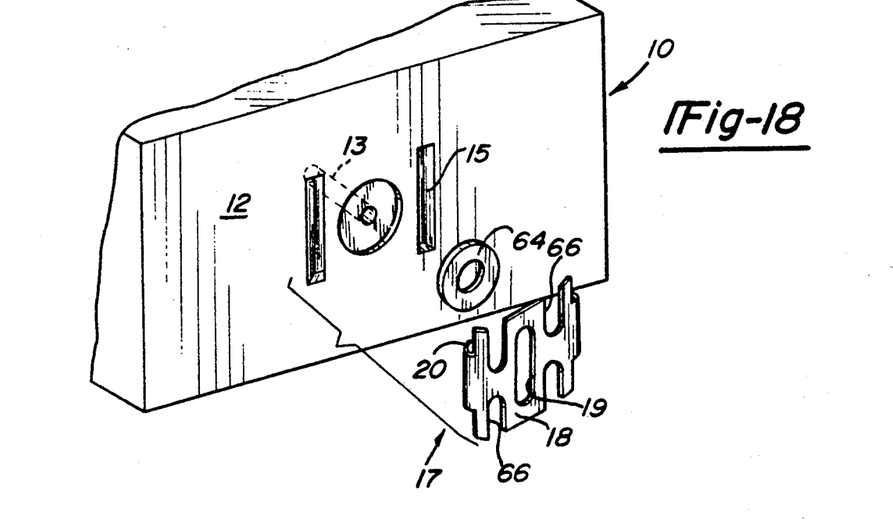
FIG. 18 is a perspective view illustrating another modification of a resiliently deformable spring steel insert and ceramic brick prior to their assembly.
Figure 19:
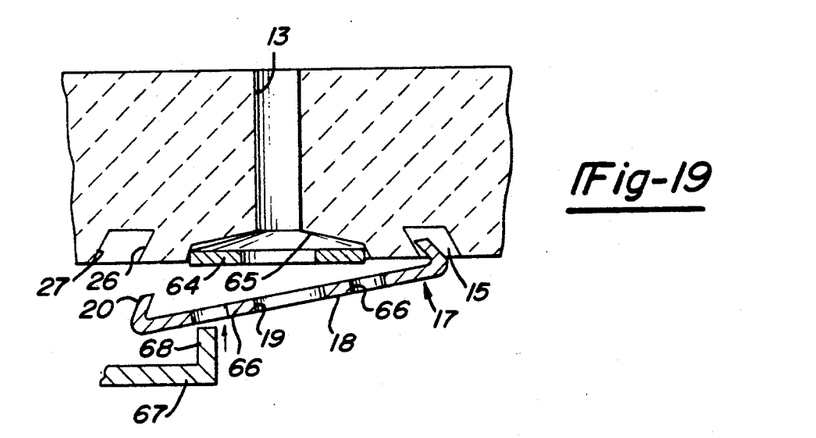
FIG. 19 and 20 are sequential views similar to FIGS. 15 and 16, showing two stages in the process of elongating and assembly of the resiliently yieldable insert and brick of FIG. 18.
Figure 20:
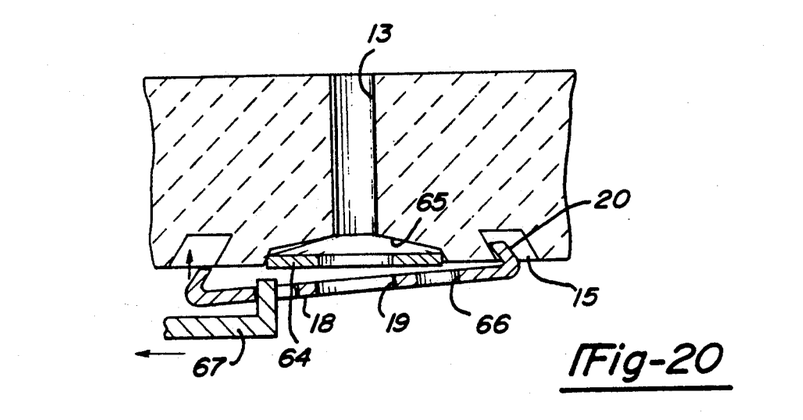

FIGS. 18–20 are directed to a modification of the concept of a resiliently yieldable insert 17 of the type described in regard to FIGS. 15 and 16. The insert 17 of FIGS. 18 and 20 is formed from a sheet steel blank comparable to the blank from which the FIGS. 15, 16 insert is formed and is thereafter heat treated to provide a resilient spring steel insert. In this case, the flat body 18 is provided with a transversely elongated opening 19 to enable welding as described above and also to facilitate longitudinal stretching of the insert 17 within the limit of its elasticity for about an eighth of an inch. At each of the opposite sides of the opening 19, the body 18 may be provided with a pair of transversely opening slits 66 that extend to approximately the longitudinal midline of the insert 17. Endwise of the slits 66, the body 18 is provided with the projections 20 inclined toward each other at angles parallel to the side walls 26 and 27 of the undercutting recesses 15. The recesses 15 are located to freely receive one or the other of the projections 20 of the undeformed insert 17 and the projections 20 are arranged to snugly engage the inclined recess walls 26 at a slight interference fit when the brick 10 and insert 17 are assembled.

The assembly is accomplished by inserting one projection 20 into one of the recesses 15 and thereafter to stretch the recess longitudinally by means of a forked tool 67 having a pair of prongs 68 engagable within the slits 67 adjacent to the other projection 20 to be inserted into the other recess 15. By moving the tool 67 in the direction of the horizontal arrow, FIG. 20, the insert 17 may be stretched longitudinally within the limits of its elasticity by reason of the elongated opening 19 and slits 66, and then forced into the aforesaid remaining recess 15, FIG. 20. Upon removal of the tool 67 and the stretching force, the insert 17 of FIGS. 18–20 will return resiliently essentially to its undeformed condition with the projections 20 snugly engaging the walls 26, again preferably with an interference fit of a few hundreths of an inch. Again, for use with one-quarter inch bricks, the bowl 65 and spacer 64 may be eliminated. Also, where the welding is to be performed as described in regard to FIG. 3, even the guide hole 13 may be eliminated. Where the insert has sufficient resiliency to enable the stretching within the elastic limits of the insert, without reliance on the slots 66, these may be eliminated. The elongated hole 19 will then enable the stretching and resilient return to the undeformed condition.

FIGS. 21–25 illustrate various steps in the sequence of forming a green unbaked ceramic brick embodying the present invention. The molding apparatus schematically illustrated comprises cooperating male and female die assemblies 71 and 72 respectively conventionally operated hydraulically to compress conventional dry powdered ceramic to the brick shape. The die assembly 72 provides an upwardly opening die or mold cavity 73 having vertical sidewalls arranged to form the edges of the brick 10. The bottom of the mold cavity 73 is defined by a vertically movable bottom plunger 74 having a plane surface for forming the surface 11 of the brick 10. The plunger 74 slides in sealing relationship along a centrally located rod 75 dimensioned to form the guide hole 13 and secured at its lower end to a fixed bottom portion 76 of the mold assembly 72.

The male die assembly 71 comprises a male die plunger 92 having a plane bottom surface portion 93 for forming the plane flat surface portion 12 of the brick 10. The central bottom portion of the plunger 92 may provide a central bulge 94 for forming the bowl 65 in the brick surface 12. Extending upwardly into the center of the plunger 92 is a small diameter elongated recess 95 for reception of the upper end of the spindle or rod 75.

A pair of punches 102 supported angularly within the male plunger 92, preferably at oppositely directed angles of incidence of approximately 60 to the surface 93, are dimensioned to form the undercutting recesses 15 and may be forced approximately an eighth of an inch or more into the partially compacted ceramic as described below. Each of the punches 102 is connected by a rod 105 to a double acting piston 103 reciprocal within a cylinder 104 contained within the body of the plunger 92. The pistons 103 are hydraulically actuated simultaneously by hydraulic fluid supplied conventionally through hydraulic lines 106 and 107, FIG. 21.

Figures 21, 22, 25:
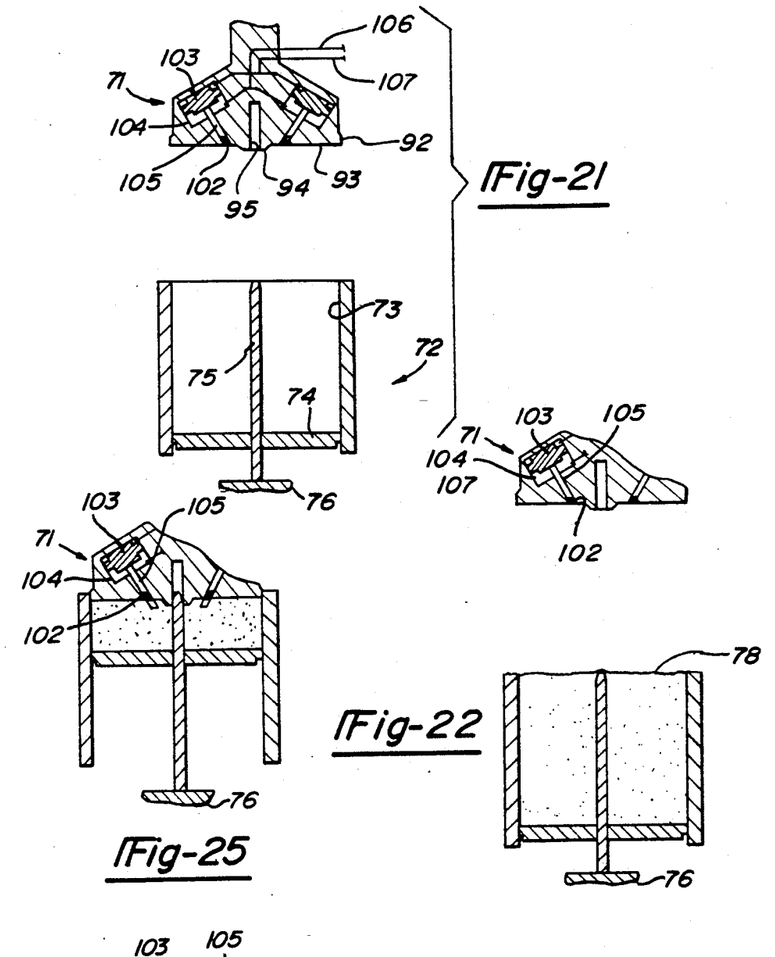
FIG. 21-25 are fragmentary sectional views through a molding apparatus, illustrating a sequence of operations to form a recessed brick embodying the present invention.

While the punches 102 are withdrawn into the body of the male plunger 92 and flush with the surface 93, and the plunger 92 is at the raised starting position of FIG. 21, the die cavity 73 is filled with an amount of loose dry powdered ceramic 78, FIG. 22, required for formation of a compacted green brick. Thereafter, with the punches flush with surface 93, the plunger 92 is moved to a preliminary or partially compacting position into the die cavity 73 with sufficient force to compact the particles of the loose powdered ceramic together and expel most of the air therefrom. In this regard, the plunger 92 is dimensioned to seal the upper opening of the cavity 73 sufficiently to prevent extrusion of the powdered ceramic around the periphery of the plunger 92 during the final high tonnage brick forming pressure, but with sufficient clearance to allow the escape of air pressed from between the ceramic particles.

Figure 23:
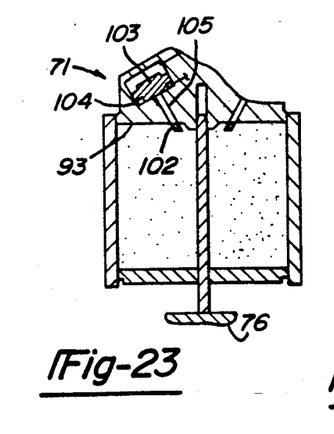

After the conventional momentary dwell period at the partially compacted FIG. 22 position, i.e., sufficient to enable the partially compacted powdered ceramic to attain an equilibrium condition as air is pressed from between the ceramic particles and escapes from the cavity 73 around the periphery of the plunger 92, hydraulic lines 107 and 106 are connected respectively to high pressure and to a low pressure return, thereby to drive the pistons 103 downwardly and force the punches 102 angularly into the partially compacted ceramic to form the recesses 15, FIG. 23.

Figure 24:
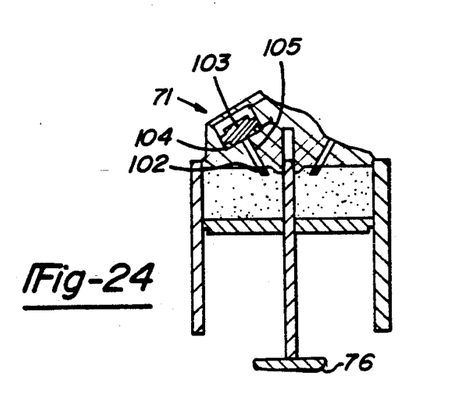

Thereafter the hydraulic compacting force is again applied, as for example by raising the bottom plunger 74 to the final high tonnage compacting position of FIG. 24. The final compacting force is maintained for the momentary dwell period as customarily required in the formation of ceramic bricks, i.e. sufficient to enable the compacted ceramic to attain an equilibrium condition as the residual air is expressed from between the ceramic particles by the final high tonnage pressure and escapes around the periphery of the plunger 92. Thereafter the pistons 103 are returned to the retracted FIG. 21 position by connecting the hydraulic lines 106 and 107 respectively to high pressure fluid and to the low pressure return, thereby to retract the punches 102 from the formed green brick. The molding pressure is then immediately relieved by returning plunger 92 to the FIG. 21 starting position, and the newly formed green brick is ejected from the mold.

Alternatively, the plunger 92 may be provided with the plane surface of plunger 74 and the plunger 74 may be provided with the surfaces 93 and 94 of plunger 92. In that event, after the final high tonnage compacting is applied between the modified plungers 92 and 74, and after the customary dwell period, the final compacting force may be relieved by elevating the modified plunger 92 prior to retraction of the punches 102. Thereafter the punches 102 will be retracted and the newly formed green brick will be ejected from the mold.

The operating sequence described, including the customary momentary dwell periods, formation of the recesses 15 in the partially compacted ceramic at the preliminary position of FIG. 23, and thereafter compacting the ceramic to the final high tonnage pressure, enables the punches 102 to be withdrawn from the compacted brick without causing collapse or deformation of the recesses 15. The withdrawal of plunger 92 from the cavity 73 immediately releases the pressure on the green brick 79 and avoids any tendency for the compacted ceramic to fill in the newly formed recesses 15.

I claim:

1. The combination of an abrasion resistant brick having a plurality of spaced recesses undercutting a surface of said brick, a weldable insert having a plurality of projections arranged to confront the openings of said recesses for insertion thereinto, and a wall of each recess inclined toward the undercut for camming the confronting projection into said undercut to interlock said insert and brick upon relative movement thereof toward each other with sufficient force to deform said projections by said camming.

2. The combination according to claim 1, said projections comprising a pair thereof spaced apart to confront the openings of a pair of said recesses, said recesses opening angularly into said surface in opposite directions with respect to each other.

3. The combination according to claim 2, said inclined walls inclining toward each other into said recesses.

4. The combination according to claim 3, wherein said brick and insert are interlocked with said projections deformed into the undercuts of said recesses.

5. The combination according to claim 1, said inclined walls of said recesses inclining in directions away from each other into said recesses, said insert having a central body spacing a pair of oppositely directed projections inclined from said body for confronting a corresponding pair of said recesses, and said projections being located at opposite sides of a line extending centrally through said body in said directions.

6. The combination according to claim 5, each projection extending angularly from said body throughout its extent from said body.

7. The combination according to claim 6, said body having spacer projections extending from said body and arranged to engage siad brick and space siad body from said brick when siad projections are deformed into said recesses by said camming.

8. The combination of an abrasion resistant brick and a weldable insert for forming a weldable brick adapted to be welded to a weldable substrate, means for interlocking said insert and brick comprising a recess in said brick opening at and undercutting a surface of siad brick, siad insert having a projection at one end within siad recess and underlying said surface, the opposite end of said insert frictionally engaging a portion of siad brick at an interference fit forcing siad projection to the limit of its movement into said recess.

9. The method of securing an abrasion resistant ceramic brick of the type recited in claim 1 to a weldable substrate, comprising the steps of welding an insert of the type recited in claim 1 to siad substrate, with said projections extending outwardly from said substrate, aligning the openings of the recesses in a brick of the type recited in claim 1 with said projections, and thereafter forcing said brick and insert toward each other to interlock the same by said camming.

10. The combination of an abrasion resistant brick having a plurality of spaced recesses extending angularly into a surface of siad brick to undercut said surface, and a weldable insert assembled with said brick, said insert having a body confronting said surface and spacing a corresponding plurality of projections confined within said recesses.

11. The combination according to claim 10, said projections extending at acute angles from said body into said recesses, and said recesses extending angularly into said surface in the same direction as said projections to undercut said surface.

12. The combination according to claim 11, the portion of said surface of aid brick spacing said recesses comprising a plane surface, and said body having a plane surface flush with the plane surface of siad brick.

13. The combination according to claim 10, said body comprising a plurality of distinct body parts connected together, each body part having one of said projections.

14. The combination according to claim 10, said brick having a pair of said recesses, said body of said insert comprising a pair of separate body parts and each body part having one of said projections at one end thereof confined within one of said recesses, the other end of each body part having a slit therein opening at said other end, each slit extending toward and terminating adjacent to said one end, said other end of body part comprising an overlying part at one side of said slit and an underlying part at the opposite side of said slit, the overlying part of each body part overlying the underlying part of the other body part.

15. The combination according to claim 10, said brick having a pair of said recesses extending angularly into said surface in directions converging toward each other.

16. The combination according to claim 10, said brick having a pair of said recesses, said insert having a corresponding pair of said projections extending into said recesses to interlock said brick and insert, said insert being deformable to enable insertion of said projections into said brick.

17. The combination according to claim 16, said insert comprising resiliently yieldable spring steel and being resiliently deformable within the limit of its elasticity prior to assembly with said brick to enable insertion of said projections into said brick.

18. The combination according to claim 17, said recesses extending angularly into said brick in directions converging toward each other, said projections similarly extending in directions converging toward each other, said insert having a body spacing said projections, said insert prior to assembly with said brick having one projection readily insertable into one of said recesses with the distal end of the other projection confronting said surface at a location adjacent to the opening of the other recess, said insert being resiliently deformable to align said distal end with said opening to enable insertion of said other projection into said other recess, and said insert being resiliently returnable essentially to its undeformed condition with its projections inserted into said recesses to interlock said insert and brick.

19. The combination according to claim 18, the body of said insert prior to said assembly being resiliently deformable arcuately to increase the distance between said distal end and said one projection sufficiently to align said distal end with said opening.

20. The combination according to claim 18, the body of said insert prior to said assembly being resiliently stretchable to increase the distance between said distal end and said one projection sufficiently to align said distal end with said opening.

* * * * *